UNITED STATES PATENT OFFICE.

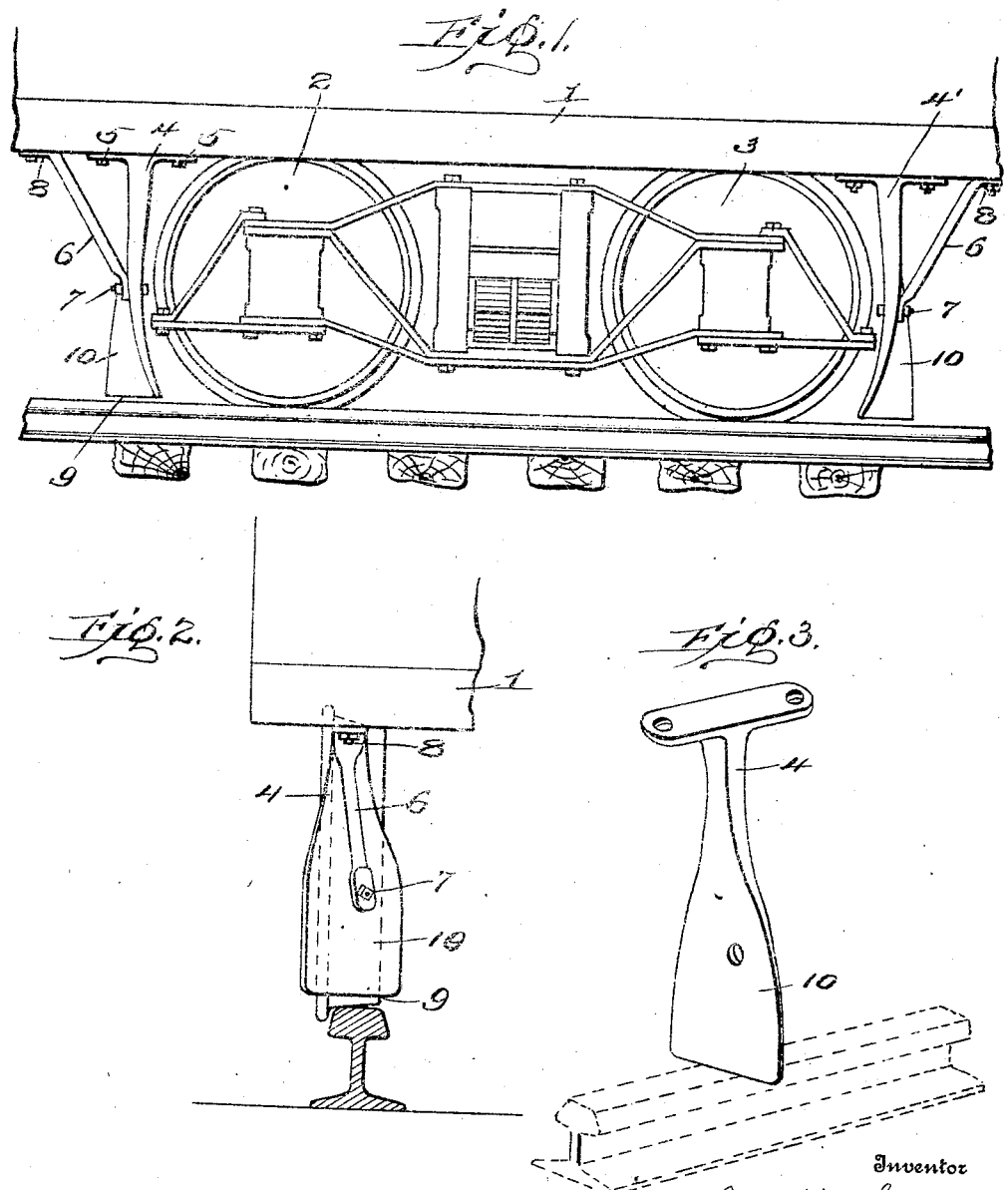

JOHN W. SPRINT, OF BOYCE, VIRGINIA, ASSIGNOR OF ONE-HALF TO JOSEPH A. DEWAR, OF MILLWOOD, VIRGINIA.

FENDER.

No. 914,985.  Specification of Letters Patent.  Patented March 9, 1909.

Application filed July 25, 1908. Serial No. 445,319.

*To all whom it may concern:*

Be it known that I, JOHN W. SPRINT, a citizen of the United States, residing at Boyce, in the county of Clarke and State of Virginia, have invented certain new and useful Improvements in Fenders; and I do hereby declare the following to be a full, clear, and exact description of the invention, such as will enable others skilled in the art to which it appertains to make and use the same.

This invention relates to improvements in guards or fenders located in front of the wheels of the car and has for its object to provide an improved guard of this kind which will engage an object in front of the wheel and move the same to one side of the track as the car travels.

Another object in view is to provide an improved guard of this kind so rigidly mounted and secured to the truck of a car in front of a wheel and so shaped and positioned as to force an object with which it comes in contact off of and laterally away from the track.

With these and other objects in view the invention comprises certain novel constructions, combinations and arrangements of parts as will be hereinafter fully described and claimed.

In the drawing:—Figure 1 is a side elevation of a truck with guards formed according to the present invention secured thereto. Fig. 2 is a detail, fragmentary front view of the truck showing the guard in front elevation. Fig. 3 is a detail perspective view of one of the guards, a fragmentary view of a rail being shown in connection therewith.

Referring to the drawing 1 indicates a truck of any desired kind provided with the usual pairs of wheels 2 and 3. In front of wheel 2 is a guard or fender 4 that is rigidly secured by any desired means as bolts 5 to the body of the truck 1, and is arranged to be placed comparatively close to the wheel 2. A brace 6 is secured by any desired means as bolt 7 to the fender 4 preferably substantially midway thereof and to the truck 1 by a bolt 8. This brace positively prevents the fender 4 from moving back against the wheel 2 and will cause the fender 4 to consequently positively force any object which comes in contact therewith forwardly and also laterally. In order that the fender 4 may force an object against which it may strike laterally or transversely of the track the same is twisted at an angle horizontally to the track so that its lower end 9 is at a considerable angle in relation to the track, preferably about a forty five degree angle. Also the lower part 10 of the fender 4 is broadened out so as to extend beyond the edges of the rail of the track. At the opposite end of truck 1 is a fender 4' which is constructed identically with fender 4 and the surrounding parts are arranged in the same manner as the surrounding parts of fender 4 so that the description of fender 4 equally applies to fender 4'. In connection with the fenders 4 and 4' it will be observed that each fender is positioned at a slight angle to a vertical plane and has the lower end thereof inclined slightly forward. This is intended to cause the fender to not only be capable of moving an object laterally or transversely of the track but to give a slight scooping action for assisting in moving an object from the track. By placing the various guards 4 and 4' in position directly in front of each wheel of the truck there will be means provided for forcing any object on the track laterally therefrom regardless of the direction of movement of the truck.

What I claim is:—

A fender for car wheels consisting of a depending bar secured at its upper end to a car truck in front of a car wheel and bent to form a broad blade extending at an angle diagonally across the car rail and a brace in front of said fender connected at one end to said truck and at the other end to said fender at the upper end of said blade.

In testimony whereof I affix my signature in presence of two witnesses.

JOHN W. SPRINT.

Witnesses:
E. T. FENWICK,
JOSEPH A. DEWAR.